United States Patent Office 2,963,599
Patented Dec. 6, 1960

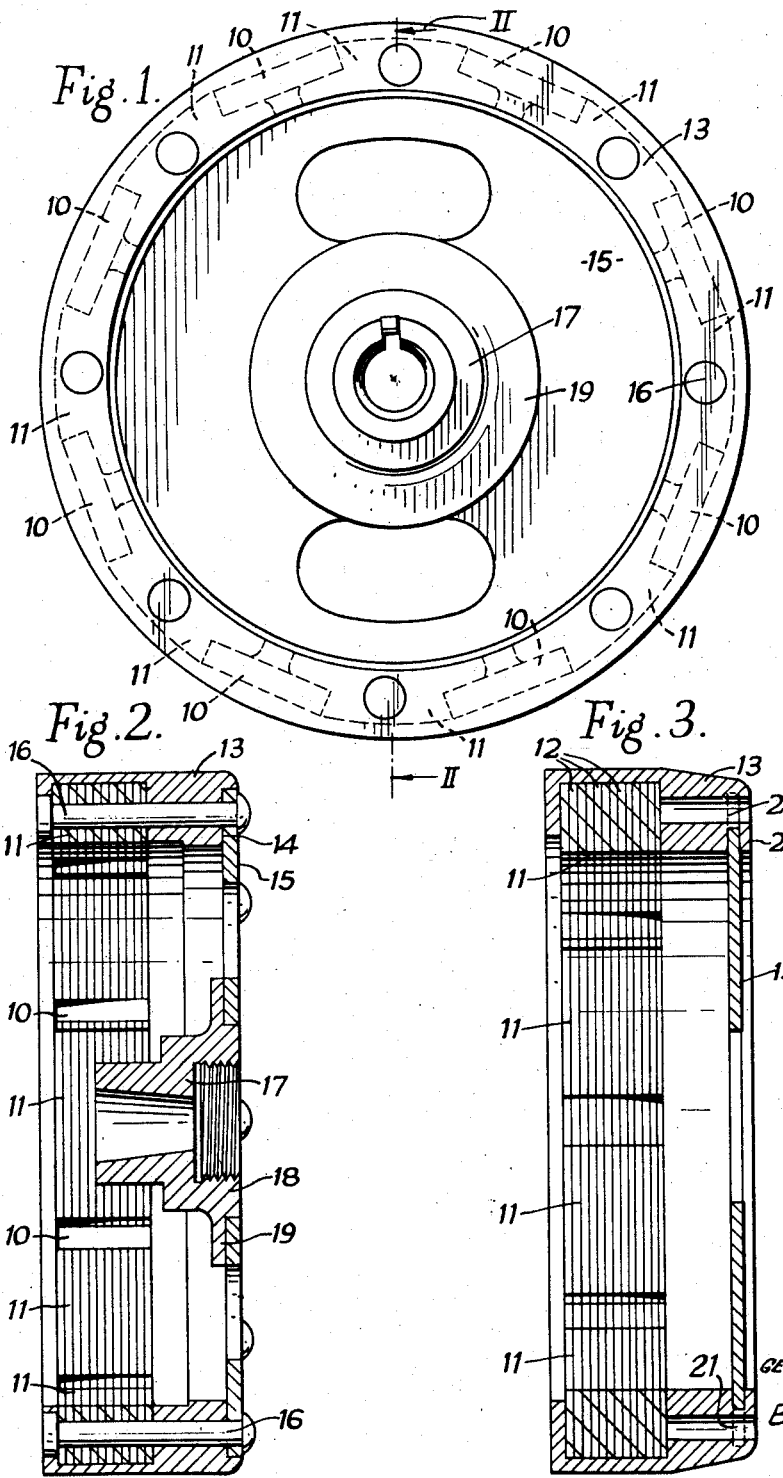

2,963,599

PERMANENT MAGNET ELECTRICAL GENERATORS

George Alfred Gayler, Bletchley, England, assignor to Wipac Development Limited

Filed Mar. 12, 1957, Ser. No. 645,568

Claims priority, application Great Britain Mar. 23, 1956

6 Claims. (Cl. 310—153)

The present invention relates to permanent magnet electrical generators and, more particularly, to rotors or flywheels for such generators.

Rotors of this kind are usually constituted by a number of permanent magnets separated by laminated pole shoes, these parts being embedded in the flange portion of a cup-shaped flywheel of non-magnetic material which is fixedly mounted upon a driving shaft.

The present invention has for its principal object to provide a rotor which can be made to occupy less space, and can be constructed more cheaply, than known rotors of the same kind.

According to the present invention a rotor for a permanent magnet electrical generator comprises a plurality of permanent magnets separated by laminated pole shoes fixedly mounted in a rim of non-magnetic material, and a steel plate spaced by non-magnetic spacing means from the magnets and pole shoes by a distance sufficient to prevent excessive flux leakage, the plate serving to connect the rim to a central hub adapted to be mounted upon a driving shaft.

The invention will now be described by way of example with reference to the accompanying drawings, in which:

Fig. 1 is a view of a rotor according to the invention,

Fig. 2 is a section along the line II—II in Fig. 1, and

Fig. 3 is a section through a diameter of another rotor according to the invention. Referring to Figs. 1 and 2 a rotor comprises eight permanent magnets 10, separated by eight laminated pole shoes 11. The axial width of the magnets and pole shoes is about ¾ inch and they are cast into a rim 13 of a suitable zinc alloy by pressure die casting.

The rim is formed with a recessed abutment face 14 about 9/16 inch from the magnets and pole shoes. A centrally apertured steel plate or disc 15 about ⅛ inch thick seats on this face and is fixed or clamped to the rim by eight equally spaced rivets 16 of non-magnetic material extending through the rim 13 and the pole shoes 11.

A steel hub 17 adapted to be mounted upon a driving shaft has a spigot 18 fitting snugly within the central aperture in the disc 15 and a flange 19 fixed by spot welding to the disc 15.

Referring to Fig. 3 there is shown a rotor of similar general construction to that shown in Figs. 1 and 2, the hub which may be as described with reference to Figs. 1 and 2, being omitted.

The magnets (not shown) and the pole shoes 11 are of similar construction to those shown in Figs. 1 and 2 and are cast into the rim 13 of a suitable zinc alloy by pressure die casting. In this embodiment the steel disc 15 is also cast into the rim 13 by pressure die casting, a flange 22 being formed over the edge of the disc 15 and fixing it to the rim 13.

Holes 21 are formed in the rim 13 by pins in the die used to cast the rim. These pins are used to locate the magnets and pole shoes.

In both these embodiments the steel disc 15 is spaced from the magnets 10 and the pole shoes 11 by a portion of the rim 13 which is of a non-magnetic material. Where rivets of like fixing means are used, as in Figs. 1 and 2, these are such as not to introduce excessive flux leakage through the disc between the magnets and pole shoes.

In other embodiments the rim 13 may be made of another non-magnetic material such as an aluminium alloy.

I claim:

1. A rotor for a permanent magnet electrical generator comprising a rim of non-magnetic material, a plurality of spaced permanent magnets fixedly mounted in said rim, a plurality of laminated pole shoes fixedly mounted in said rim between said magnets, a steel plate fixedly supporting said rim, a hub mounted centrally in said steel plate, said plate extending outwardly from said hub to said rim, non-magnetic spacing means spacing said steel plate from said magnets and pole shoes, said spacing means comprising an abutment surface transverse to the axis of the rotor and means for clamping said plate against said surface in fixed relationship to the rim.

2. A rotor according to claim 1, wherein said spacing means is part of said rim.

3. A rotor according to claim 1, wherein said clamping means comprises non-magnetic rivets.

4. A rotor according to claim 3, wherein said spacing means is part of said rim.

5. A rotor according to claim 1, wherein said clamping means comprises a flange cast integrally with said rim and formed over the edge of the plate to fix the latter to said rim.

6. A rotor for a permanent magnet electrical generator comprising a rim of non-magnetic material, a plurality of spaced permanent magnets and a plurality of laminated pole shoes arranged alternately between said magnets circumferentially of said rim, said magnets and said pole shoes being secured in said rim by casting the latter thereabout, a steel plate abutting and fixedly supporting said rim, a hub mounted centrally in said steel plate, non-magnetic spacing means spacing said steel plate from said magnets and pole shoes and including means for clamping said plate in fixed relationship to the rim.

References Cited in the file of this patent

UNITED STATES PATENTS

| 1,283,373 | Van Deventer | Oct. 29, 1918 |
| 2,392,500 | Phelon | Jan. 8, 1946 |

FOREIGN PATENTS

| 1,049,088 | France | Aug. 12, 1953 |